United States Patent [19]

Olmsted et al.

[11] Patent Number: 4,493,750
[45] Date of Patent: Jan. 15, 1985

[54] THERMODYNAMIC CONDITIONING OF AIR OR ANY OTHER GAS TO INCREASE THE OPERATING EFFICIENCY OF DIVERSE ENERGY CONSUMING SYSTEMS

[76] Inventors: James F. Olmsted, 4620 26th St., N., Arlington, Va. 22207; Sherwood F. Webster, 7832 Via Marina, Scottsdale, Ariz. 85258; Richard L. Heise, 133 E. Garfield, Tempe, Ariz. 85281

[21] Appl. No.: 398,977

[22] Filed: Jul. 16, 1982

[51] Int. Cl.$^3$ ................ B01D 1/14; B01D 3/06; F24C 9/00; F26B 3/02
[52] U.S. Cl. ................ 159/48.1; 34/32; 122/26; 126/247; 203/10; 203/99; 432/29
[58] Field of Search ............ 159/1 R, 1 G, 4 R, 4 A, 159/4 B, 4 J, 4 K, 43.1, 46, 48.1, 48.2; 210/600; 239/13, 135, 553.5, DIG. 23; 48/197 R; 126/247; 122/26; 137/338; 237/1 R, 50, 81; 432/29, 42, 72, 219; 266/47; 34/32; 203/10, 99

[56] References Cited

U.S. PATENT DOCUMENTS

| | | | |
|---|---|---|---|
| 348,772 | 9/1886 | Pearce | 126/247 |
| 797,847 | 8/1905 | Gilroy | 126/247 |
| 823,856 | 6/1906 | Gilroy | 126/247 |
| 1,682,102 | 8/1928 | Allen | 126/247 |
| 2,107,933 | 2/1938 | Crockett et al. | 237/1 R |
| 2,449,366 | 9/1948 | Bowen et al. | 159/43.1 |
| 2,683,940 | 7/1954 | Pixler | 126/247 |
| 3,813,036 | 5/1974 | Lutz | 122/26 |
| 4,181,098 | 1/1980 | Kruse | 126/247 |
| 4,187,617 | 2/1980 | Becker et al. | 159/4 A |
| 4,381,762 | 5/1983 | Ernst | 126/247 |

*Primary Examiner*—Bradley Garris
*Attorney, Agent, or Firm*—B. P. Fishburne, Jr.

[57] ABSTRACT

Air or any other gas in a moving stream possessing kinetic energy is impinged on a foraminous barrier having a multitude of dissimilar adjacent nozzle orifices. Such impingement converts the kinetic energy of the stream to internal energy within the gas; and compression through the nozzle orifices of the foraminous barrier also increases the internal energy and reduces the pressure of the air or other gas (Bernoulli's principle), and greatly increases the downstream intensity of turbulence in the flowing air or gas. This treatment conditions the air, after its expansion in a processing chamber, to effect mixing with and rapid vaporization of liquid substances at low temperatures without the addition of external sensible heat, or with less external sensible heat, thus effecting savings of energy in many industrial, commercial and consumer applications. Typically, the foraminous barrier consists of two screens having appropriate characteristics pressed together in firm contact with their interstices randomly arranged. The foraminous barrier can be installed on diverse new and existing equipment.

11 Claims, 7 Drawing Figures

THERMODYNAMIC CONDITIONING OF AIR OR ANY OTHER GAS TO INCREASE THE OPERATING EFFICIENCY OF DIVERSE ENERGY CONSUMING SYSTEMS

BACKGROUND OF THE INVENTION

The general objective of the present invention is to improve the operational efficiency of, and thus save energy in, many industrial, commercial and consumer energy conversion systems which require the introduction of air or other gases in comingling relationship with materials, including liquids, semi-liquids and other flowables. The invention is applicable to both combustion and non-combustion energy consuming processes of a highly diverse nature.

In its essence, the present invention involves a thermodynamic treatment of air or any other gas in a manner whereby the air or gas has dramatically improved ability to initiate and rapidly complete vaporization of liquids at comparatively low temperatures (approximately 130° F. for gasoline), without the addition of external sensible heat: and also has markedly increased ability to promote mixing with other materials due to increased scale of turbulence. Palmer, *The Hydrodynamic Stability of Rapidly Evaporating Liquids at Reduced Pressure*, Vol. 75, Part 3, JOURNAL OF FLUID MECHANICS, 487-511, 1976, and Bennett and Myers, *Momentum, Heat, and Mass Transfer*, 2nd Ed., 1974, at 147-151 and 548-550.

The above treatment of air or other gas is very simply obtained by causing a flowing stream of air or gas possessing kinetic energy to impinge on a foraminous barrier and pass through a matrix of dissimilar adjacent nozzle orifices in the barrier to a utilization space beyond the barrier where diverse material processing in energy consuming systems takes place.

Upon impingement at the foraminous barrier, the kinetic energy of the stream is converted to internal energy within the air or gas. After being compressed through the nozzle matrix provided within the barrier, which further increases its internal energy, the pressure of the flowing stream is markedly reduced (Bernoulli's principle). The adiabatic expansion of the air or gas upon leaving the nozzle orifices increases its ability to transfer its unusually high internal energy to another comingling medium in the processing chamber which aids in initiating and completing low temperature vaporization (differential vaporization). Pierce, *Microscopic Thermodynamics*, 1968, at pages 46-50, 284-285 and 303; Palmer and Maheshri, *Enhanced Interfacial Heat Transfer by Differential Vapor Recoil Instabilities*, INTERNATIONAL JOURNAL HEAT MASS TRANSFER, 117-122, January, 1981; Anis and Buthod, *How Flashing Fluids Change Phase in Pipelines*, THE OIL AND GAS JOURNAL, 150-157, June 24, 1974; Hoffman, *Differential Vaporization Curves for Complex Mixtures*, CHEMICAL ENGINEERING SCIENCE, Vol. 24, 1734-1736, 1969; and Collins, *Flow of Fluids Through Porous Materials*, 1961, at pages 246-248. Simultaneously, the intensity of turbulence of air or gas exiting the nozzle matrix of the foraminous barrier is drastically increased, without reducing the scale of turbulence, which promotes unusually rapid vaporization, drying or oxidization of another medium in the processing space downstream from the barrier, namely, a liquid, semi-liquid, paste or other flowable; and also enables thorough mixing with such medium, Palmer (supra); Bennett and Myers (supra); and Pope and Goin, *High-Speed Wind Tunnel Testing*, 99-102, John Wiley and Sons, Inc., New York; and Miyashita et al., *Flow Behavior and Augmentation of the Mass Transfer Rate in a Rectangular Duct with a Turbulence Promoter*, Vol. 21, No. 4, INTERNATIONAL CHEMICAL ENGINEERING, 646-651, October, 1981.

Typically, the foraminous barrier employed in the thermodynamic treatment of air or gas consists of two screen sections, one relatively coarse and one relatively fine, in a mesh number ratio of approximately 0.375:1. The coarser screen section is placed upstream relative to the air or gas flow path and the finer screen section is placed downstream. The two screen sections are pressed together into firm contact with their interstices and apertures randomly arranged. In situations where it is not desired to promote mixing of the treated air or gas with another medium, the interstices of the two screen sections are arranged symmetrically with the screen apertures in registration. In this case, the mesh number ratio is approximately 0.5:1 to enable proper aperture registration. The mesh number ratio of 0.375:1 where mixing is desired is chosen to assure that the apertures of the two screen sections cannot register when the screen sections are pressed together randomly.

The utilization of two screen sections only in the mesh number ratio specified to promote mixing and rapid, low temperature vaporization, drying or oxidization is critical in the invention and a significant departure from this arrangement will destroy substantially the utility of the foraminous barrier. For example, a single screen of any mesh number will not function properly because, when intensity of turbulence increases as mesh number increases, scale of turbulence decreases inversely. Scale of turbulence is the factor which promotes mixing, whereas intensity of turbulence promotes rapid vaporization. Therefore, when both of these factors are essential to a given process, the dual screen arrangement specified above must be used, Bennett and Myers (supra), and Pruppacher and Rasmussen, *A Wind Tunnel Investigation of the Rate of Evaporation*, JOURNAL OF THE ATMOSPHERIC SCIENCES, 1257-1258, July, 1979.

The two screen sections which form the foraminous barrier are advantageously formed of stainless steel, but in some cases, can be formed from other materials including other metals and synthetics. The screen sections or the strands from which they are woven may be coated with a catalyst in order to promote the desired chemical effect. In still other cases, the foraminous barrier can consist of two porous membranes of natural or synthetic materials or can be formed by a pair of contacting perforated plates having, respectively, matrixes of relatively coarse and relatively fine square apertures corresponding to the required mesh number ratio stated above, approximately 0.375:1.

It should be stated that significant benefits for the environment are derived from the invention. This is due to the fact that processes carried out at relatively low temperatures produces significantly less pollutants, such as nitrous oxide, compared to processes carried out at higher temperatures.

Examples of other gases, in addition to air, which might be treated in accordance with the invention are carbon dioxide, oxygen and nitrogen.

As suggested previously, thermodynamically conditioned air or gas in accordance with the invention lends itself to a wide variety of uses. One of the most widespread applications of the invention is the spray drying process, where it is believed the invention will constitute a major advance in the art. The scope of application of spray drying and hence the diverse application of the invention is well defined by Masters, *Spray Drying*, 2nd Ed., 1976, John Wiley & Sons, New York. This publication, and U.S. Pat. No. 4,187,617, describe essentially a one step suspended particle process wherein the feed is a solution, suspension or paste. The resulting dried product conforms to powders, granules or agglomerates. The above-referenced spray drying publication and patent both describe introducing external sensible heat into air before the latter is blown into the drying process chamber. A substantial reduction of such external heat, if not complete elimination of it in some cases, with resultant conservation of energy, is achieved by placing the foraminous barrier in accordance with this invention across the flow path of air or other gas entering the chamber, very slightly upstream from the orifice of the feed nozzle.

The unusually high internal energy of the entering nozzled air, its low pressure, and its high intensity of turbulence developed by passing through the foraminous barrier, combine to effect rapid complete vaporization of the liquid content of the feed, thorough and rapid mixing of the nozzled air with feed particles, or more rapid drying with substantially less energy expended. To achieve these multiple benefits, the temperature of the incoming air or gas need only be 5°–25° F. above the dew point temperature of the particular liquid feed.

Another important application of the invention lies potentially in water desalinization by using the foraminous barrier to upgrade flash vaporization to differential vaporization in one or more stages of the system, Howe, *Fundamentals of Water Desalination*, 1974, pages 67–72 and 149–154.

Another important application of the invention lies in the field of sewage treatment where the foraminous barrier of the invention can be placed across incoming air streams of such systems.

Other practical applications of the present invention include fluidized bed heat exchangers of the types shown in U.S. Pat. Nos. 4,307,773, 4,272,895 and 4,226,830; material treatment systems of the type shown in U.S. Pat. No. 4,109,394; food roasting systems as disclosed in U.S. Pat. No. 3,964,175: and fluid bed driers for foods and other products, U.S. Pat. No. 3,849,900. Other examples of practical uses of the invention are mentioned hereinafter. Such uses are almost without limit, and it should be understood that the principle of the invention is applicable to any system where it is required or desirable to achieve rapid low temperature vaporization, together with thorough and continuous mixing of a product or product component with air or other gas, without the necessity of applying great amounts of external sensible heat to the air or gas or to the product being processed.

Other features and advantages of the invention will become apparent during the course of the following detailed description.

BRIEF DESCRIPTION OF THE DRAWINGS

FIG. 4 is a fragmentary vertical section taken on line 4—4 of FIG. 3a.

DETAILED DESCRIPTION

Figure 1:
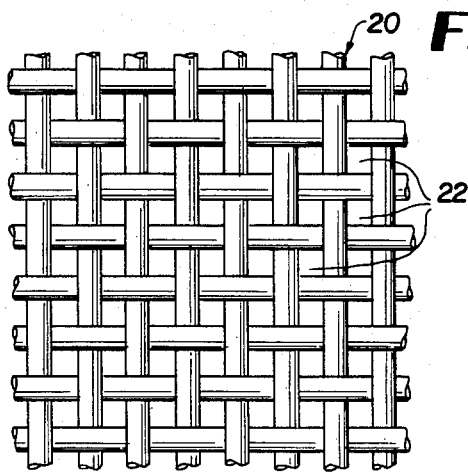
FIG. 1 is a fragmentary plan view of a relatively coarse screen section forming one component of a foraminous barrier used in the thermodynamic conditioning of air or gas according to the invention.

Referring to the drawings in detail wherein like numerals designate like parts, attention is directed first to FIGS. 1–5 showing screen components which form a foraminous barrier comprising the essence of the invention.

In FIG. 1, a preferably stainless steel screen section 20 of any required size and shape has a mesh number for many important applications in the range of 30–60 (holes per inch). It should be understood that the mesh numbers specified herein may vary depending upon particular applications of the invention. For example, small scale applications, including medical, pharmaceutical and biological, may require mesh numbers above the typical ranges specified while large industrial applications, such as blast furnaces and fluidized bed gasification reactors, may require mesh numbers below the ranges stated above. The screen section 20 is the coarser of two screen sections employed to produce a foraminous barrier in this invention.

Figure 2:
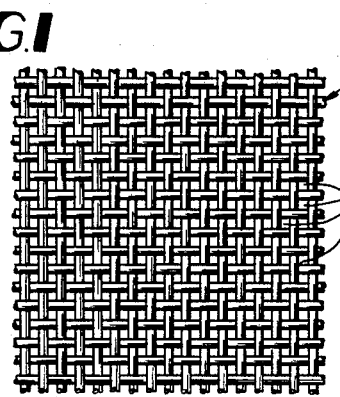
FIG. 2 is a similar view of a relatively fine screen section forming a second component of the foraminous barrier.

A companion screen section 21, FIG. 2, preferably formed of stainless steel, has a mesh number in the range of 90–240. This screen section is the finer of the two making up the foraminous barrier, and is always placed at the downstream face of the barrier, in relation to a stream of air or gas impinging on the barrier.

The two described screen sections 20 and 21 are usually installed flat for most uses but can be installed vertically, horizontally or at any intermediate angle across an air or gas stream. In some cases, however, the screens forming the barrier may be cylindrical or in other bent forms to meet the needs of a particular situation.

Figure 3A:
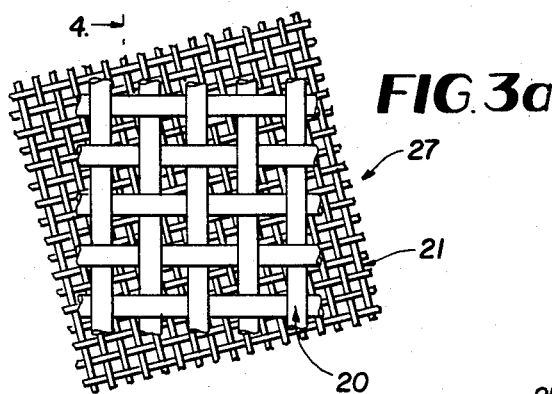
FIG. 3a is an enlarged fragmentary plan view of the two screen sections shown in FIGS. 1 and 2 pressed together in firm contact with their apertures and interstices randomly arranged on three axes.

FIG. 3a shows the two screen sections 20 and 21 assembled in face-to-face firm contact with their apertures 22 and 23 and interstices randomly arranged on three axes to form in the barrier and through it a multitude of dissimilar adjacent nozzle orifices. For the typical mesh numbers specified above, suitable for many industrial and commercial applications, the preferred ratio of the mesh number of screen 20 to the mesh number of screen 21 is approximately 0.375:1.

Figure 3B:
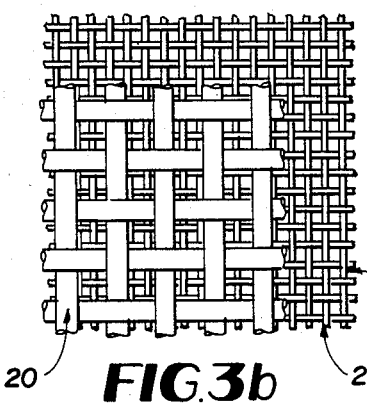
FIG. 3b is a similar view of the two screen sections with their apertures and interstices randomly arranged on two orthogonal axes.

FIG. 3b shows the screen sections 20 and 21 pressed together with their apertures and interstices randomly disposed or offset on two orthogonal axes only, without rotation on the third axis. The arrangement in FIG. 3a is preferable in some commercial applications. While all screen apertures are shown square, in some cases the apertures of the finer screen 21 could be oblong along one axis only without disturbing the desired mode of operation. However, the mesh number of the finer screen must be as specified herein along at least one orthogonal axis. Also, the coarser screen 20 must always form the upstream face of the foraminous barrier.

Figure 4:
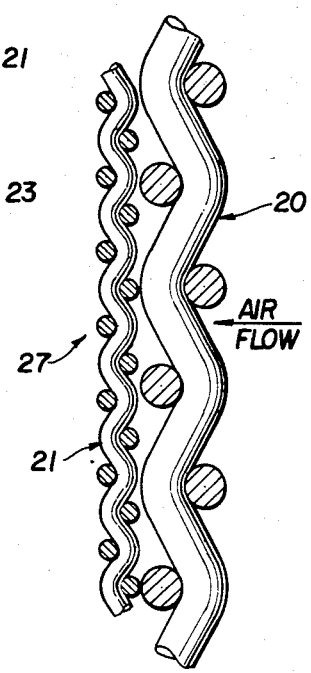

FIG. 4 shows the two screen sections 20 and 21 pressed together firmly and randomly with the coarser screen 20 on the upstream side of the barrier and the finer screen 21 in the downstream side relative to the air or gas flow path.

Figure 5:
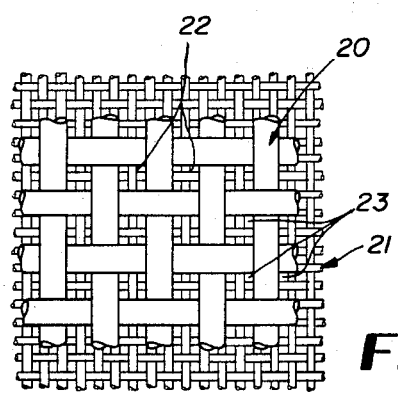
FIG. 5 is a view similar to FIG. 3b where the screen apertures and interstices are symmetrically arranged in registration in accordance with a variation in mode of operation.

FIG. 5 shows a variant of the invention where the screen sections 20 and 21 are pressed together symmetrically with their apertures 22 and 23 in coaxial registration, rather than randomly disposed. When this situation prevails, the ratio of the mesh number of screen 20 to the mesh number of screen 21 is approximately 0.5:1. This mesh number ratio enables screen aperture registration as shown in FIG. 5, wherein the previously stated mesh number ratio of 0.375:1 precludes complete aperture registration in the random aperture situation shown in FIG. 3a. The arrangement of the screen sections shown in FIGS. 3a and 3b is necessary when vaporization and mixing are desired, while the arrangement in FIG. 5 is employed when it is desired to achieve vaporization, drying or oxidization without promoting mixing of air or gas with a product. Except for the reduced mixing, the barrier structure in FIG. 5 possesses the same advantages as the structures of FIGS. 3a and 3b, as regards converting kinetic energy to internal energy and producing low temperature vaporization. However, the arrangement in FIG. 5 reduces the scale of turbulence and therefore does not create as much mixing in a processing space as the mixing obtained with the randomly assembled dual screens shown in FIGS. 3a and 3b.

Figure 6:
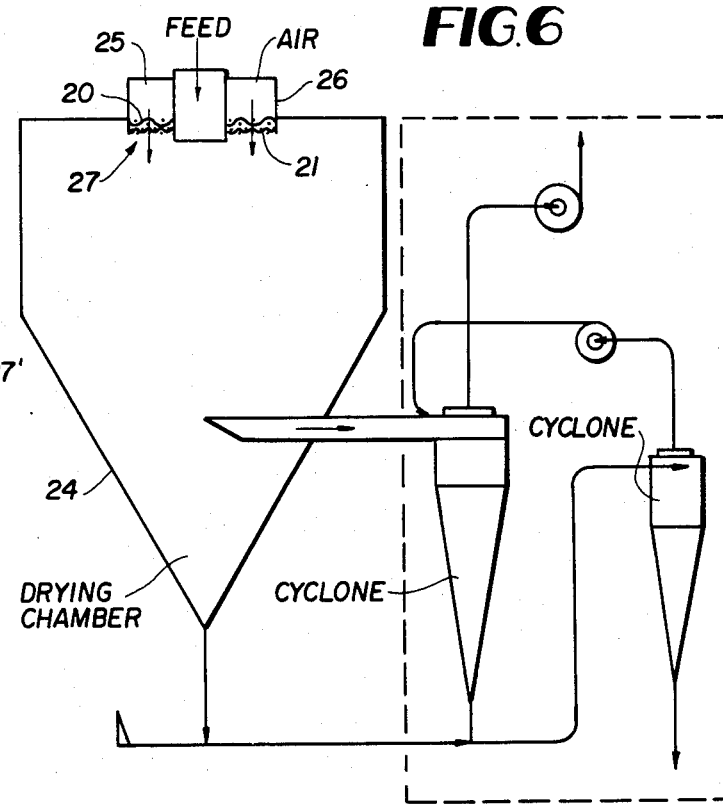
FIG. 6 is a schematic view of a spray drying system utilizing the invention.

FIG. 6 illustrates one of the most widespread commercial applications of the invention, namely, spray drying. Spray drying is essentially a one step continuous suspended particle drying process which finds application in a wide variety of industries, as described in Masters (supra).

In FIG. 6, a spray drying system includes a drying chamber 24 receiving at one end thereof an atomized product spray delivered by a nozzle means 25. Substantially dew point temperature air in a flowing stream possessing kinetic energy is separately delivered to the chamber 24 through a manifold 26 coaxial with and surrounding feed nozzle means 25. A foraminous barrier 27 consisting of the two screen sections 20 and 21 as described in connection with FIG. 3 is placed very slightly upstream from the outlet of the orifice in nozzle means 25, so as to treat air or gas entering the drying chamber 24 from the manifold 26 without similarly treating the atomized feed delivered by the nozzle means 25.

The unusually high internal energy of the air discharged from the foraminous barrier 27, its reduced pressure, and its increased intensity of turbulence, combine to greatly enhance the one step spray drying process and allow a substantial savings in energy compared to prior art practice where the air temperature is externally increased to well above 200° F., Masters, *Spray Drying* (supra) and U.S. Pat. No. 4,187,617.

In a generally similar manner, the foraminous barrier according to the invention, in whatever size and shape is required, can be installed at strategic locations in a great variety of industrial, commercial and consumer equipment, to improve the operational efficiency of the same, and reduce considerably the consumption of external energy to increase temperature. Notable among these diverse applications, but not limited thereto, are the following:

I. Agriculture

A. Food, fiber and fish processing
1. Crop preparation—sorting, cleaning, skinning and drying
2. First stage operations—milling, pressing and grinding
3. Final stage operations—flavoring, coloring, drying freezing and packaging II. Mineral and Metallurgical A. Metal ores, hydrocarbons, stone and clay operations
1. Ore preparation—sorting, cleaning and drying
2. First stage operations—smelting, blast furnaces, roasting and refining
3. Final stage operations—separation, cooling and forming III. Textile Manufacture A. Weaving, knitting and finishing
1. Fiber preparation—cotton ginning, cleaning, sorting and drying
2. First stage operations—drying after bleaching, sizing, etc.
3. Final stage operations—drying after dyeing IV. Lumber and Wood Products A. Veneer and plywood production
1. Drying before and after bonding
2. Drying after coating V. Furniture Manufacture A. Wood bending operations
1. Drying after bending VI. Paper and Paperboard Manufacture A. Drying operations in various stages of process VII. Printing A. Drying after inking VIII. Glass and Glass Container Manufacture A. Production operations
Raw material preparation, melting and fining
Conditioning, blowing and setting
Fiber spraying, annealing and after-working IX. Rubber Products A. Foaming
B. Vulcanization and cooling X. Leather Products A. Processing operations
1. Hide preparation—curing and unhairing
2. Primary processes—tanning, dyeing and lubricating
3. Finishing—coating, brushing, buffing and glazing XI. Kiln Furnace applications A. Firing, baking, roasting, drying and burning of various materials such as cement, bricks and ceramics

XII. Chemical, Cosmetic and Pharmaceutical Preparations

Numerous applications and materials.

XIII. Downstream Equipment

1. Evaporators
2. Driers
3. Dehumidifiers
4. Vaporizers
5. Air brushes
6. Air cleaning equipment
7. Air blasting of abrasives
8. Laundry and dry cleaning equipment
9. Hair driers, clothes driers and dish washers The terms and expressions which have been employed herein are used as terms of description and not of limitation, and there is no intention, in the use of such terms and expressions, of excluding any equivalents of the features shown and described.

We claim:

1. A method of treating gas for use in diverse energy consuming systems to improve the efficiency of such systems and reduce energy consumption and air pollution, comprising the steps of causing a moving stream of gas possessing kinetic energy to impinge against the upstream side of a foraminous barrier having a multitute of dis-similar adjacent nozzle orifices and thereby convert its kinetic energy substantially into internal energy within the gas, then compressing the gas through said nozzle orifices of the foraminous barrier to further increase its internal energy and to reduce the pressure of the gas at the time of downstream adiabatic expansion of the gas and substantially increasing both its intensity of turbulence and scale of turbulence in a space downstream of the foraminous barrier, where the gas is enabled to mix in such space with another substance therein and to very rapidly transfer unusually high latent heat to said substance so as to vaporize, dry or oxidize it at unusually low temperature, the foraminous barrier consisting of a single pair of screen sections arranged in face-to-face contact with their interstices and apertures randomly arranged to form said multitude of dis-similar adjacent nozzle orifices, and the upstream screen section being of a coarser mesh than the downstream screen section in the approximate mesh number ratio of 0.375:1.

2. The method of claim 1, and the additional step of directing the gas treated by the foraminous barrier into contact with a spray of feed to be dried in a spray drying chamber at the downstream side of the foraminous barrier.

3. The method of claim 1, wherein the gas treated by the foraminous barrier is employed in a fluidized bed heat exchanger.

4. The method of claim 1, wherein the gas treated by the foraminous barrier is employed in a solid fuel gasification reactor.

5. The method of claim 1, wherein the gas treated by the foraminous barrier is employed in a food processing system.

6. The method of claim 1, wherein the gas treated by the foraminous barrier is employed in a metallurgical blast furnace for producing iron, steel or other metals, the foraminous barrier being placed across the orifices of the tuyeres of said furnace.

7. The method of claim 1, wherein gas treated by said foraminous barrier is employed to improve water quality more efficiently in multi-stage flash distillation desalinization plants by upgrading flash vaporization to differential vaporization in one or more stages of such plants.

8. The method of claim 1, wherein gas treated by the foraminous barrier is employed in sewage treatment plants by placing the foraminous barrier across incoming gas streams of gas inlet conduits in such plants.

9. A method of treating gas for use in diverse energy consuming systems to improve the efficeincy of such systems and reduce energy consumption and air pollution, comprising the steps of causing a moving stream of gas possessing kinetic energy to impinge against the upstream side of a foraminous barrier having a multitude of similar adjacent nozzle orifices and thereby convert its kinetic energy substantially into internal energy within the gas, then compressing the gas through said nozzle orifices of the foraminous barrier to further increase its internal energy and to reduce the pressure of the gas at the time downstream adiabatic expansion of the gas and substantially increasing its intensity of turbulence while reducing the scale of turbulence in a space downstream of the foraminous barrier, where the gas is enabled to contact in such space with another substance therein and to very rapidly transfer unusually high internal energy to said substance so as to vaporize, dry or oxidize it at unusually low temperture, and the foraminous barrier consisting of a single pair of screen sections arranged in face-to-face contact and having their apertures symmetrically arranged in registration, and the upstream screen section being coarser than the downstream screen section in the approximate mesh number ratio of 0.5:1.

10. A method of spray drying comprising delivering an atomized spray of feed to be dried to a spray drying chamber, and separately delivering to said spray drying chamber a stream of air at a temperature of approximately 5° F.-25° F. above the dew point temperature of said feed by forcing the air stream which possesses kinetic energy to impinge on a foraminous barrier consisting of a pair of screen sections arranged in face-to-face contact with their interstices and apertures randomly arranged, the upstream screen section being coarser than the downstream screen section in the approximate mesh number ratio of 0.375:1, compressing the air stream through said foraminous barrier very slightly upstream from the location at which the spray of feed enters the spray drying chamber, whereby vaporization of moisture in the feed is initiated nad rapidly completed by rapid heat transfer from low pressure air possessing unusually high internal energy and intensity of turbulence after it passes through the foraminous barrier, and mixing of the air with the feed in the spray drying chamber being promoted by the increased scale of turbulence of the air caused by passing of the air stream through the foraminous barrier.

11. A method of treating gas before the gas acts on liquid and/or particulate material in a processing chamber into which the treated gas and material are separately introduced, comprising causing a moving gas stream to impinge on a foraminous barrier consiting of a single pair of screen sections arranged in face-to-face contact with their interstices and apertures randomly arranged to form a multitude of dis-similar adjacent nozzle orifices, the upstream screen section being of a coarser mesh than the downstream screen section in the approximate mesh number ratio of 0.375:1 at the entrance to said processing chamber, adiabatically compressing the gas through said nozzle orifices, both operations increasing the internal energy within the gas, and subsequently expanding the gas into said processing chamber at a decreased pressure to transfer its unusually high internal energy to said material in said processing chamber and simultaneously causing the expanding gas to have its scale of turbulence increased in said expansion to induce mixing with the material in said chamber, and simultaneously causing the expanding gas to have its intensity of turbulence increased to cause more rapid vaporization or drying at low temperature of the material in said chamber.

* * * * *